US010913885B1

(12) United States Patent
Fripp et al.

(10) Patent No.: US 10,913,885 B1
(45) Date of Patent: Feb. 9, 2021

(54) METAL THAT HYDRATES IN WELLBORE FLUID AND CREATES AN EXPANDING CEMENT

(71) Applicant: Halliburton Energy Services, Inc., Houston, TX (US)

(72) Inventors: Michael Linley Fripp, Carrollton, TX (US); Stephen Michael Greci, Little Elm, TX (US); Zachary William Walton, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/515,752

(22) Filed: Jul. 18, 2019

(51) Int. Cl.
| | | |
|---|---|---|
| *C09K 8/467* | (2006.01) | |
| *C04B 14/34* | (2006.01) | |
| *C04B 20/00* | (2006.01) | |
| *E21B 33/14* | (2006.01) | |

(52) U.S. Cl.
CPC .............. *C09K 8/467* (2013.01); *C04B 14/34* (2013.01); *C04B 20/008* (2013.01)

(58) Field of Classification Search
CPC . C09K 21/14; C09K 8/42; C09K 8/46; C09K 5/16; C04B 2/06; C04B 2/04; C04B 2/066; C04B 2111/56; C04B 28/02; C04B 28/10; E21B 17/00; E21B 17/04; E21B 33/13; E21B 33/14

See application file for complete search history.

(56) References Cited

U.S. PATENT DOCUMENTS

| | | | |
|---|---|---|---|
| 4,933,235 A | * | 6/1990 | Kellner ................. C09J 117/00 156/187 |
| 7,040,404 B2 | | 5/2006 | Brothers et al. |
| 7,578,347 B2 | | 8/2009 | Bosma et al. |
| 9,574,419 B2 | | 2/2017 | James |
| 2003/0150614 A1 | | 8/2003 | Brown et al. |
| 2008/0000641 A1 | | 1/2008 | Caveny et al. |
| 2012/0152540 A1 | | 6/2012 | Patil et al. |
| 2016/0137912 A1 | | 5/2016 | Sherman et al. |

FOREIGN PATENT DOCUMENTS

| | | | |
|---|---|---|---|
| CN | 108365183 A | * | 8/2018 |
| JP | 11255552 A | | 9/1999 |

OTHER PUBLICATIONS

Foreign Communication of Related Application—International Search Report and Written Opinion of the International Searching Authority International Application No. PCT/US2019/043960, dated Apr. 14, 2020, 10 pages.

* cited by examiner

*Primary Examiner* — Zakiya W Bates
(74) *Attorney, Agent, or Firm* — Conley Rose, P.C.; Rodney B. Carroll

(57) ABSTRACT

Methods and systems that utilize reactive metals that hydrate in the presence of a wellbore fluid. The reactive metals can be utilized in cement compositions, on the outer surface of the oilfield tubular in the form of a layer of the reactive metal(s), or on the outer surface of the oilfield tubular in the form of a layer of a composition that includes the reactive metal(s).

17 Claims, 13 Drawing Sheets

METAL THAT HYDRATES IN WELLBORE FLUID AND CREATES AN EXPANDING CEMENT

TECHNICAL FIELD

This present disclosure relates generally to the cementing of oilfield tubulars in a wellbore that is formed in a subterranean formation.

BACKGROUND

When drilling a wellbore into a subterranean formation for the purposes of hydrocarbon or other fluid recovery from a subterranean formation, it is known to cement oilfield tubulars to the inner wall of the wellbore by pumping a cement slurry into the annulus that exists between the inner wall of the wellbore and the outer surface of the tubular. Doing so prevents fluids leaking from the subterranean formation into the wellbore, and prevents wellbore fluids leaking from the wellbore into the subterranean formation. Over time, for various reasons (such as cement shrinkage or movement), spaces, cracks, and gaps can form in the cement, between the cement, or between the cement and the inner wall of the wellbore. These spaces, cracks, and gaps can lead to intrusion of fluids from the subterranean formation into the wellbore, or vice versa, at locations that are not intended or desired.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods and systems that utilize reactive metals that hydrate in wellbore fluids, i.e., in-situ of a wellbore. The methods and systems disclosed herein are particularly useful for use in the annulus formed between an oilfield tubular and the inner wall of the wellbore, with and without cement compositions in the annulus. In the presence of wellbore fluids that contain water, atoms of the reactive metal reacts with molecules of water to produce a product having a volume that is greater than the volume of the reactive metal itself. The general reaction is:

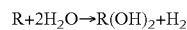

where R is the atom of reactive metal, $H_2O$ is a molecule of water, $H_2$ is hydrogen, and $R(OH)_2$ is a hydroxide compound containing the reactive metal R. The reaction, which can be referred to as a hydration reaction, produces the metal hydroxide; and a metal hydroxide particle has a larger volume than the reactive metal particle from which it is created. The reactive metals disclosed herein can be utilized in cement compositions that are placed in the annulus in order to cement the oilfield tubular into the wellbore. Additionally or alternatively, the reactive metals can be utilized on the outer surface of the oilfield tubular in the form of a layer of the reactive metal(s) or in the form of a layer of a composition that includes the reactive metal(s). Alternatively still, the disclosed cement compositions can be used in combination with a layer of the reactive metal(s) or a layer of a composition that includes the reactive metal(s). In these contexts, the reactive metal can be used in presence of a wellbore fluid containing water to create metal hydroxide particles that provide a seal and plug spaces, cracks, and gaps that form in the cement or oilfield tubular.

Figure 1:
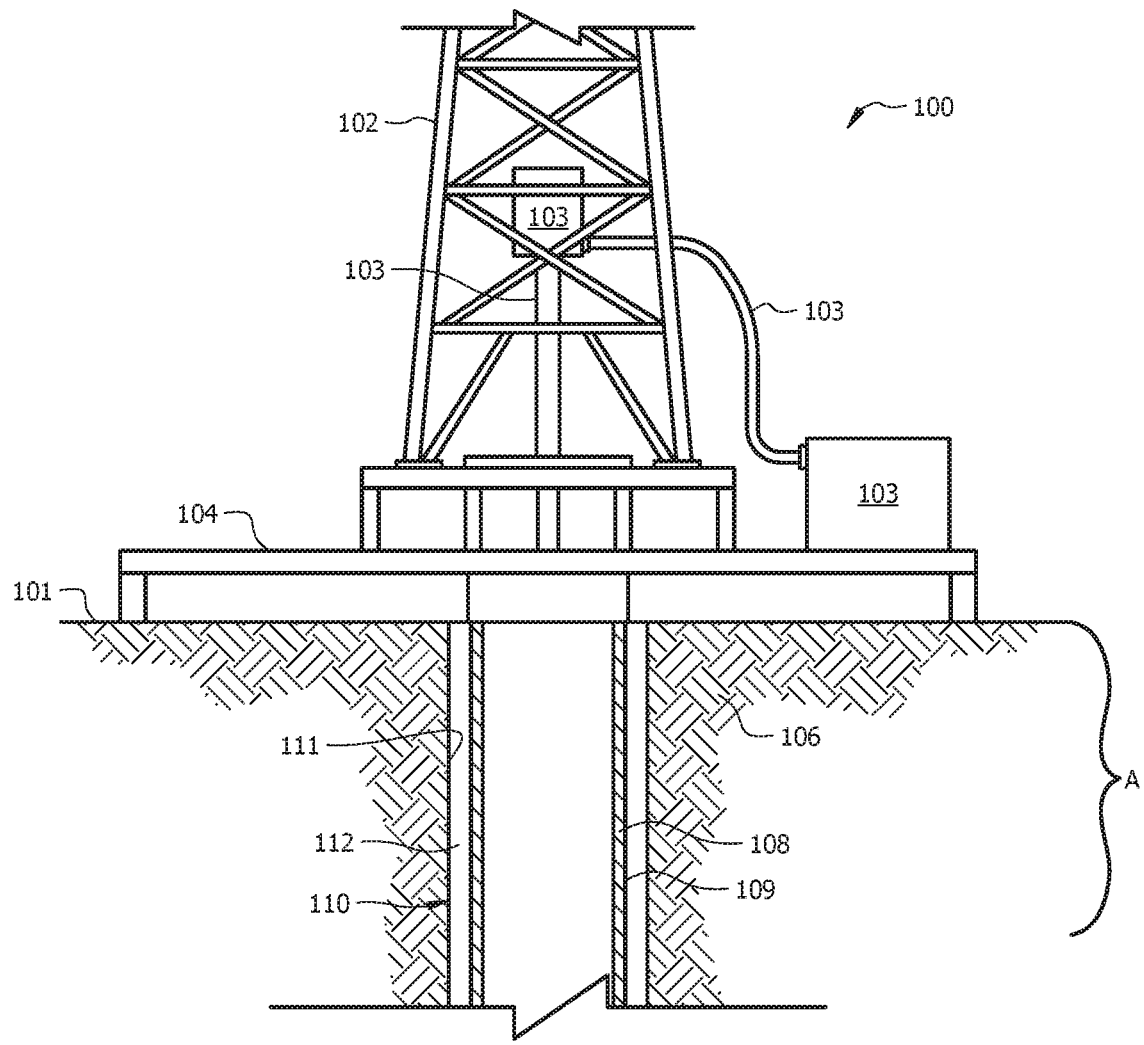
FIG. 1 is a cross-sectional view of a wellbore in an onshore wellbore environment.

FIG. 1 illustrates a wellbore environment 100 in which reactive metal(s) are utilized in the disclosed embodiments. The subterranean formation 106 and wellbore 110 are illustrated in cross-sectional view. In FIG. 1, it can be seen that a wellbore 110 was formed in the subterranean formation 106. While the wellbore 110 is shown extending generally vertically into the subterranean formation 106 (e.g., vertically oriented), the disclosure is also applicable to wellbores having a section that extends at an angle through the subterranean formation 106, such as a horizontal, lateral, or a slanted section (e.g., horizontally oriented) of the wellbore 110. The term "vertically oriented" as used herein may refer to a section of the wellbore 110 that has a longitudinal axis that may be exactly vertical or may extend at an angle with respect to vertical that is +/−89°, and similarly, the term "horizontally oriented" as used herein may refer to a section of the wellbore 110 that has a longitudinal axis that may be exactly horizontal or may extend at an angle with respect to horizontal that is +/−89°.

The wellbore 110 contains an oilfield tubular 108 therein, that extends into the wellbore 110 such that an annulus 112 is formed between an inner wall 111 of the wellbore 110 and an outer surface 109 of the oilfield tubular 108. As used herein, the term "oilfield tubular" refers to any structure used to line the wall of any section of the wellbore 110. Tubular segments may vary with regard to material, thickness, inner diameter, outer diameter, grade, and/or end connectors, and various tubular segment types are known in the industry such as conductor casing, surface casing, intermediate casing, production casing, liner, and liner tieback casing. Tubular segments are often joined or coupled together to form a "string" that protects the integrity of a desired length of a wellbore (e.g., entire wellbore or at least part of the wellbore). While some strings can hang from the earth's surface 101, other strings (e.g., liners) can hang from another tubular or tubular string within the depths of the wellbore 110.

FIG. 1 shows surface equipment 103 that can be configured to accomplish the methods of the present disclosure. The derrick 102 and the rig floor 104 remain at the surface 101 of the earth. In some embodiments, the surface equipment 103 can include cementing equipment that is configured to mix and to introduce a cement composition according to the disclosure into the annulus 112 that is formed between the inner wall 111 of the wellbore 110 and the outer surface 109 of the oilfield tubular 108. The introduction of a disclosed cement composition into the annulus 112 can be accomplished according to any technique known in the art, such as by pumping the cement composition down the interior of the oilfield tubular 108 and then upward through the annulus 112 or such as by pumping the cement composition down through the annulus 112 and then upward through the interior of the oilfield tubular 108 (e.g., reverse circulation techniques). A disclosed cement composition may be allowed to set in the annulus 112 to form a cement sheath that supports and positions the oilfield tubular 108 in the wellbore 110.

FIG. 1 shows section A as being a portion of the wellbore 110 that connects to the surface 101. However, this is shown for clarity in FIG. 1, and it is contemplated that section A can be any portion of the wellbore 110 at any depth.

Also, even though FIG. 1 depicts a wellbore environment 100 that is onshore, it should be understood by those skilled in the art that embodiments of the present disclosure can be equally applied in an offshore wellbore environment.

Figure 2A:
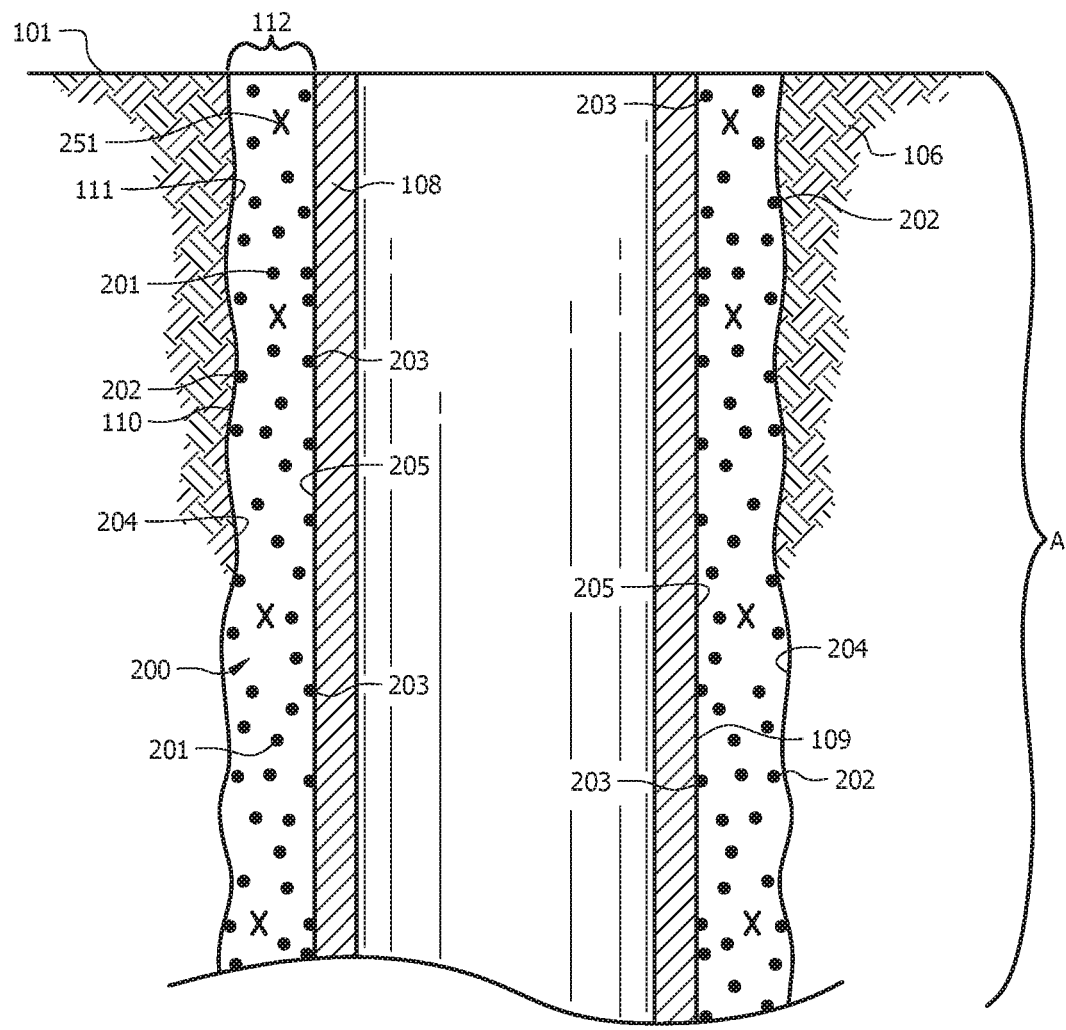
FIGS. 2A to 2B illustrate cross-sectional views of section A of the wellbore 110 of FIG. 1, having embodiments of cement compositions that utilize one or more of the reactive metals of the present disclosure.
Figure 2B:
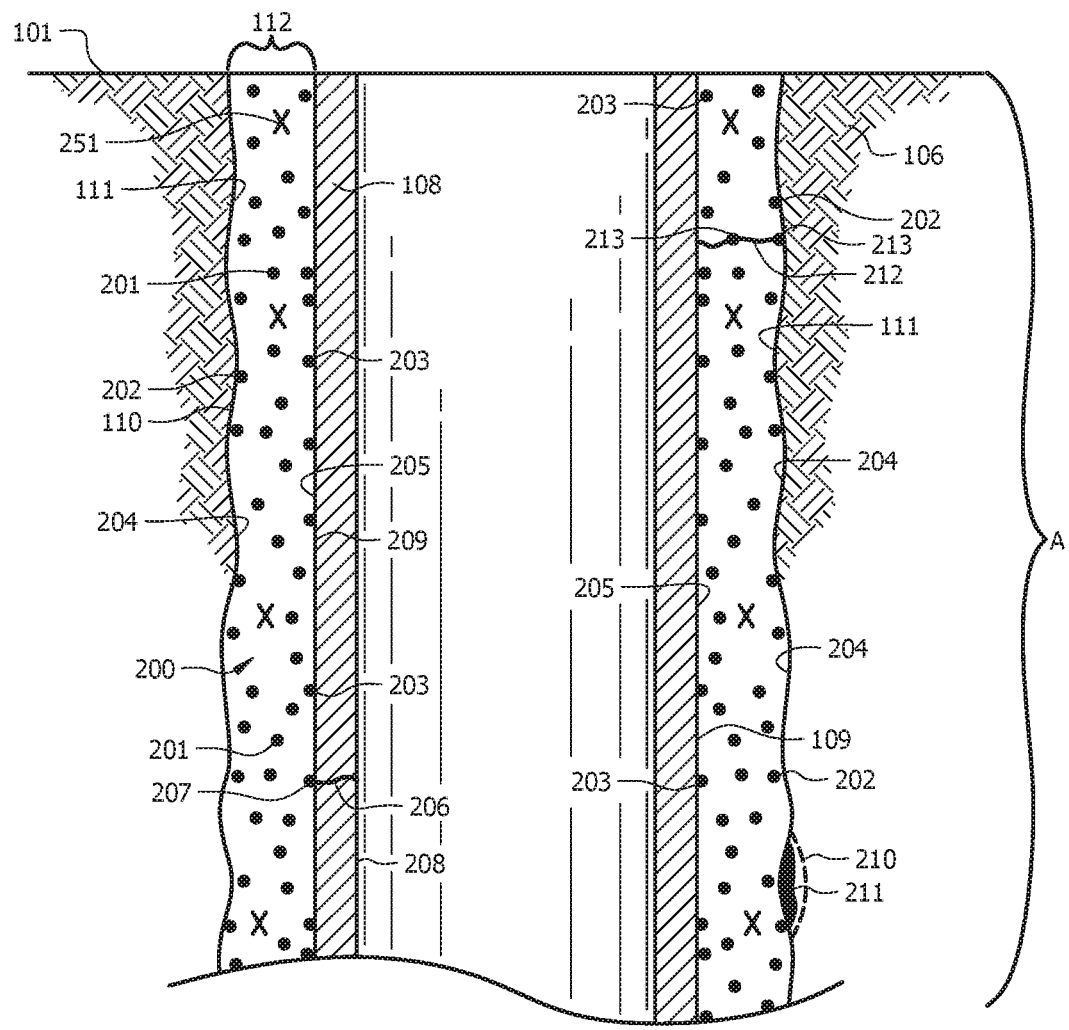

FIGS. 2A to 2B illustrate cross-sectional views of section A of the wellbore 110 of FIG. 1, having embodiments of a cement composition 200 that utilizes one or more of the reactive metals of the present disclosure. Like numbers in FIGS. 2A to 2B represent like components with respect to FIG. 1 and with respect to one another.

FIG. 2A illustrates section A of the wellbore 110 of FIG. 1, having a cement composition 200 according to the disclosure. The cement composition 200 has been introduced into the wellbore 110 such that the cement composition 200 is contained in the annulus 112 that is formed between the inner wall 111 of the wellbore 110 and the outer surface 109 of the oilfield tubular 108. Particles 201, 202, and 203 of the reactive metal(s) can be seen as dispersed in the cement composition 200 in the FIG. 2. The particles 201, 202, and 203 were previously mixed and dispersed in the cement composition 200 using equipment 103 so that when the cement composition 200 was introduced into the annulus 112, some particles 201 of the reactive metal(s) are in the middle of the cement composition 200, some particles 202 of the reactive metal(s) are on the outer surface 204 of the cement composition 200 that faces the inner wall 111 of the wellbore, and some particles 203 of the reactive metal(s) are on the inner surface 205 of the cement composition 200 that faces the outer surface 109 of the oilfield tubular 108.

Cement compositions that are pumped into a wellbore generally contain water, and as the cement composition 200 dries/cures in-situ of the wellbore 110, the cement can shrink while the reactive metal particles 201, 202, 203 can counter shrinkage by reacting with the water to form metal hydroxides having a larger volume in the cement composition 200.

In some embodiments, the cement composition 200 can contain particles 251 of a galvanic dopant. As explained in more detail herein, the galvanic dopant is present to facilitate reaction (e.g., hydration) of the reactive metal(s) with water in the wellbore fluid.

FIG. 2B illustrates section A of the wellbore 110 of FIG. 2A, showing metal hydroxide particles 207 and 211 that formed after reactive metal particles reacted with water contained in a wellbore fluid. A crack 206 that formed in the oilfield tubular 108 allowed a wellbore fluid to leak from the inner surface 208 of the oilfield tubular 108 to outer surface 109 of the oilfield tubular 108. Water in the wellbore fluid reacted with the reactive metal particle to form metal hydroxide particle 207, which is shown in FIG. 2B as having a larger volume than the original reactive metal particle. The metal hydroxide particle 207 filled the crack 206 at the outer surface 109 of the oilfield tubular 108, and as such, the metal hydroxide particle 207 can prevent the wellbore fluid from further leaking between the inner surface 209 of the cement composition 200 and the outer surface 109 of the oilfield tubular 108.

FIG. 2B also shows a space 210 that was formed between the inner wall 111 of the wellbore and the outer surface 204 of the cement composition 200. Fluid permeated from the subterranean formation 106 into the wellbore 110 at the space 210, causing reactive metal particles to react with the water in the fluid and to form metal hydroxide particles 211 so as to at least partially fill the space 210. The presence of the metal hydroxide particles 211 can prevent the wellbore fluid from accumulating in the space 210. The space 210 is shown on the formation side of the cement but could also be located on the cement side proximate the casing 205 or in between.

FIG. 2B also shows a crack 212 in the cement composition 200. Wellbore fluid leaked into the crack 212 from the subterranean formation 106, and reactive metal particles contained within the cement composition 200 reacted with water to produce metal hydroxide particles 213 in the cement composition 200. The metal hydroxide particles 213 filled the crack 212 in the cement composition 200, and as such, the metal hydroxide particles 213 can prevent the wellbore fluid from further leaking into the cement composition 200 via the crack 212. The crack 212 can be oriented circumferentially, axially, radially, or a combination thereof within the cement composition 200.

In FIGS. 2A and 2B, the reactive metal is in the cement composition(s) in the form of solid metal particles. In preferred embodiments, the metal particles are not in the form of a powdered oxide because the hydration reaction can be better controlled when the reactive metal is in the form of a larger particle. In preferred embodiments, the metal particles can be pieces or chunks of the reactive metal(s) of any shape (e.g., spheroid, ribbon-shaped, acicular, corpuscular, or any combination thereof). In embodiments, a dimension (e.g., a length, width, height, or diameter) of a single particle of reactive metal corresponds to a size of greater than 0.0254 cm (0.01 inches). Alternatively stated, no dimension (e.g., a length, width, height, or diameter) of a single particle is less than 0.0254 cm (0.01 inches). In additional or alternative embodiments, the particle size of the metal particles is greater than powder particle size (which is less than 0.003 inches (0.0076 cm)). That is, the particle size of the metal particles is greater than 0.003 inches (0.0076 cm). The metal particles are electrically conductive while oxide powders are electrically insulating.

A concentration of reactive metal(s) in the disclosed cement composition(s) can be chosen so that the expected volume increase from the reactive metal conversion to reactive metal hydroxide is equal to or about equal to (slightly greater than or slightly less than) the expected shrinkage of the cement composition in the wellbore 110. In another example, the concentration of reactive metal is substantially larger than the expected volume reduction and can expand from greater than 2 to 10 times the expected cement shrinkage. In other examples, the concentration of reactive metal is related to the relative volume of the cement composition 200 and the concentration of the reactive metal constitutes 1 vol % to 51 vol % of the total volume of the cement composition 200.

Figure 3A:
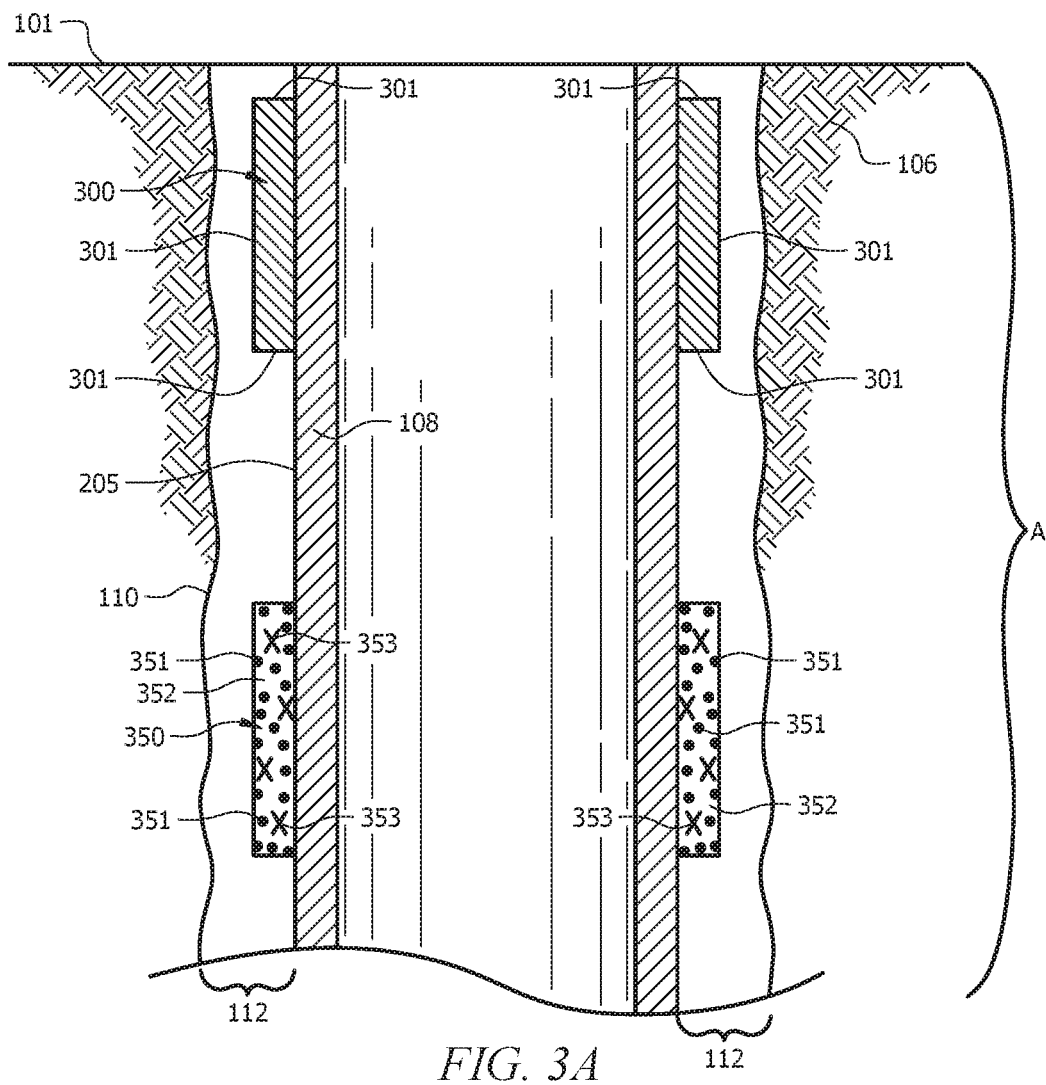
FIGS. 3A to 3F illustrate cross-sectional views of section A of the wellbore of FIG. 1, having embodiments of layers of one or more of the reactive metals of the present disclosure that are on an outer surface of an oilfield tubular.
Figure 3B:
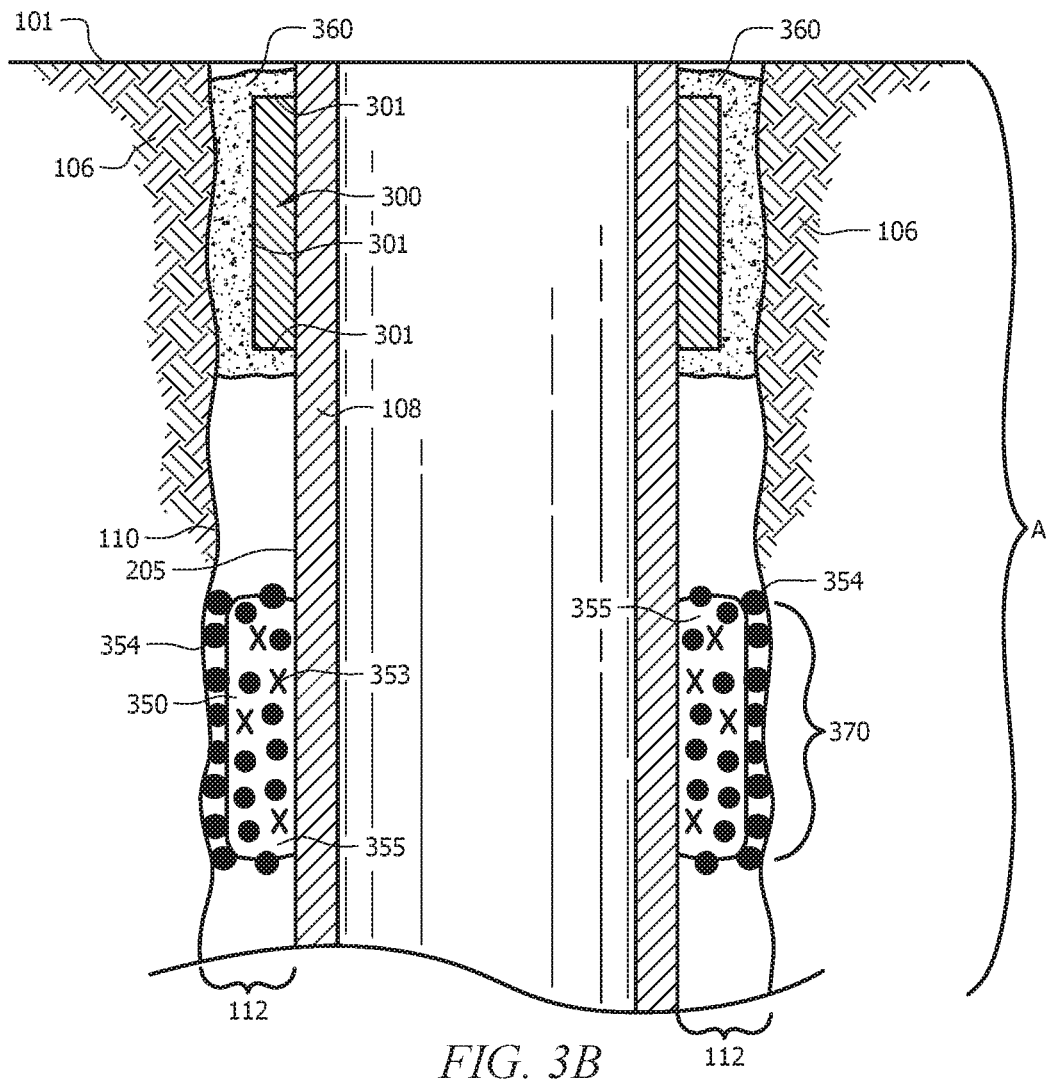
Figure 3C:
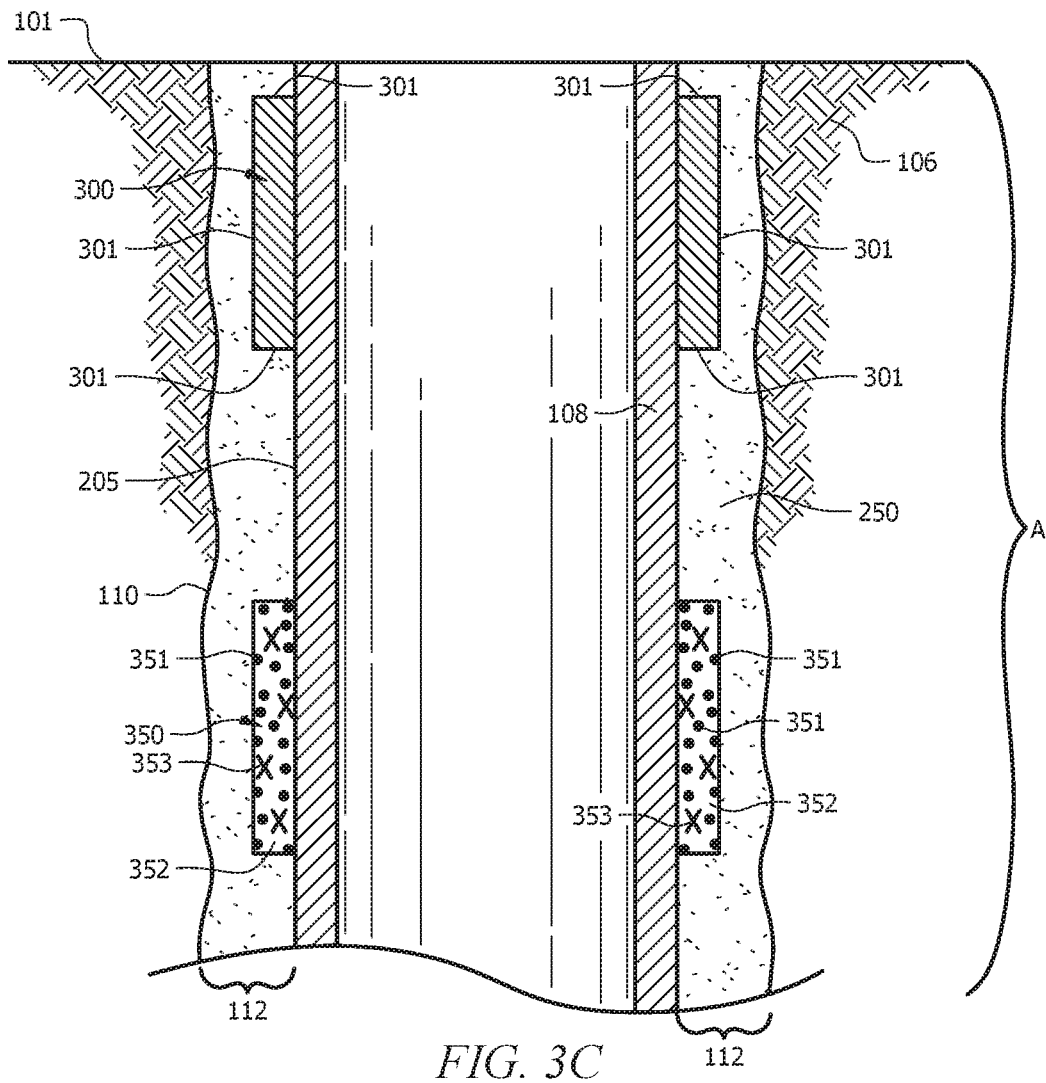
Figure 3D:
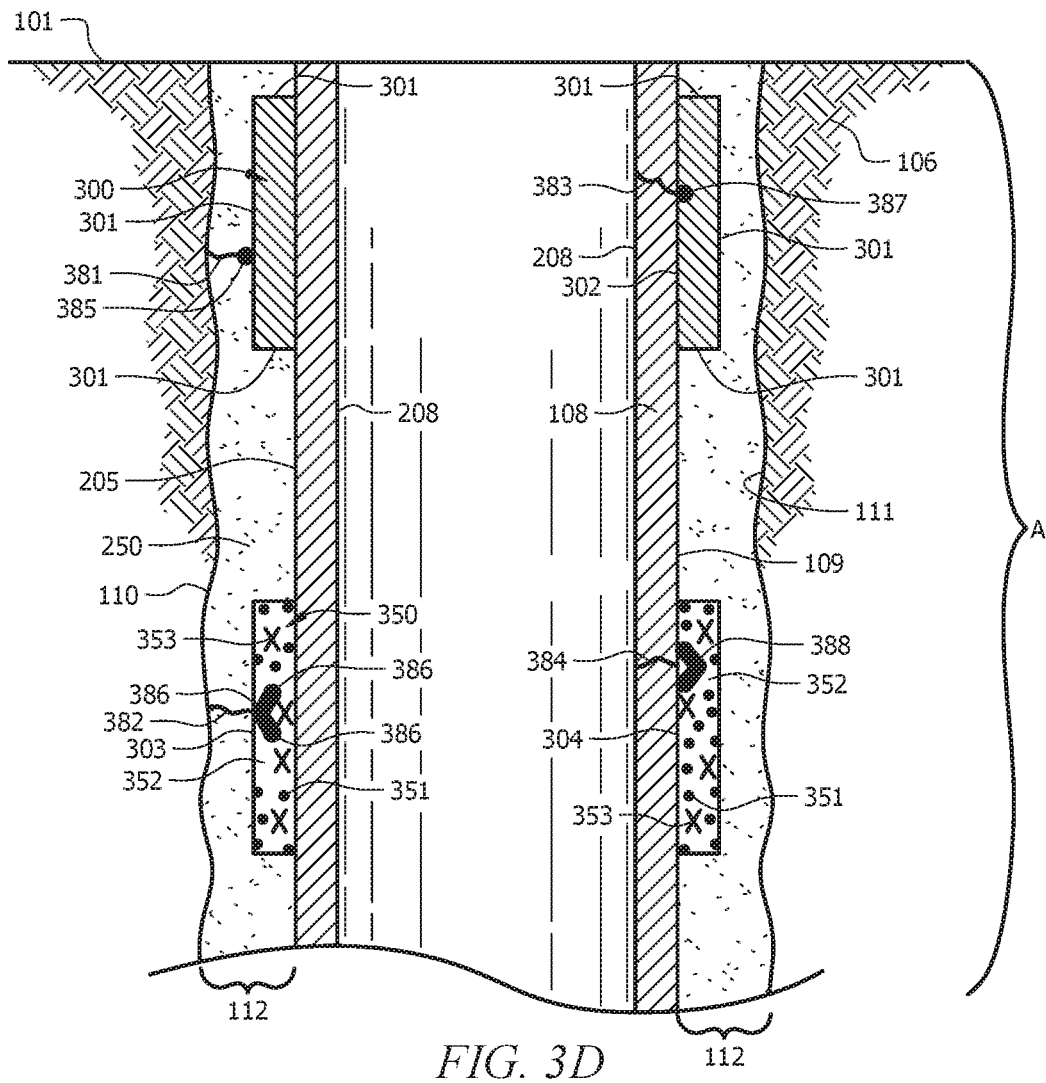
Figure 3E:
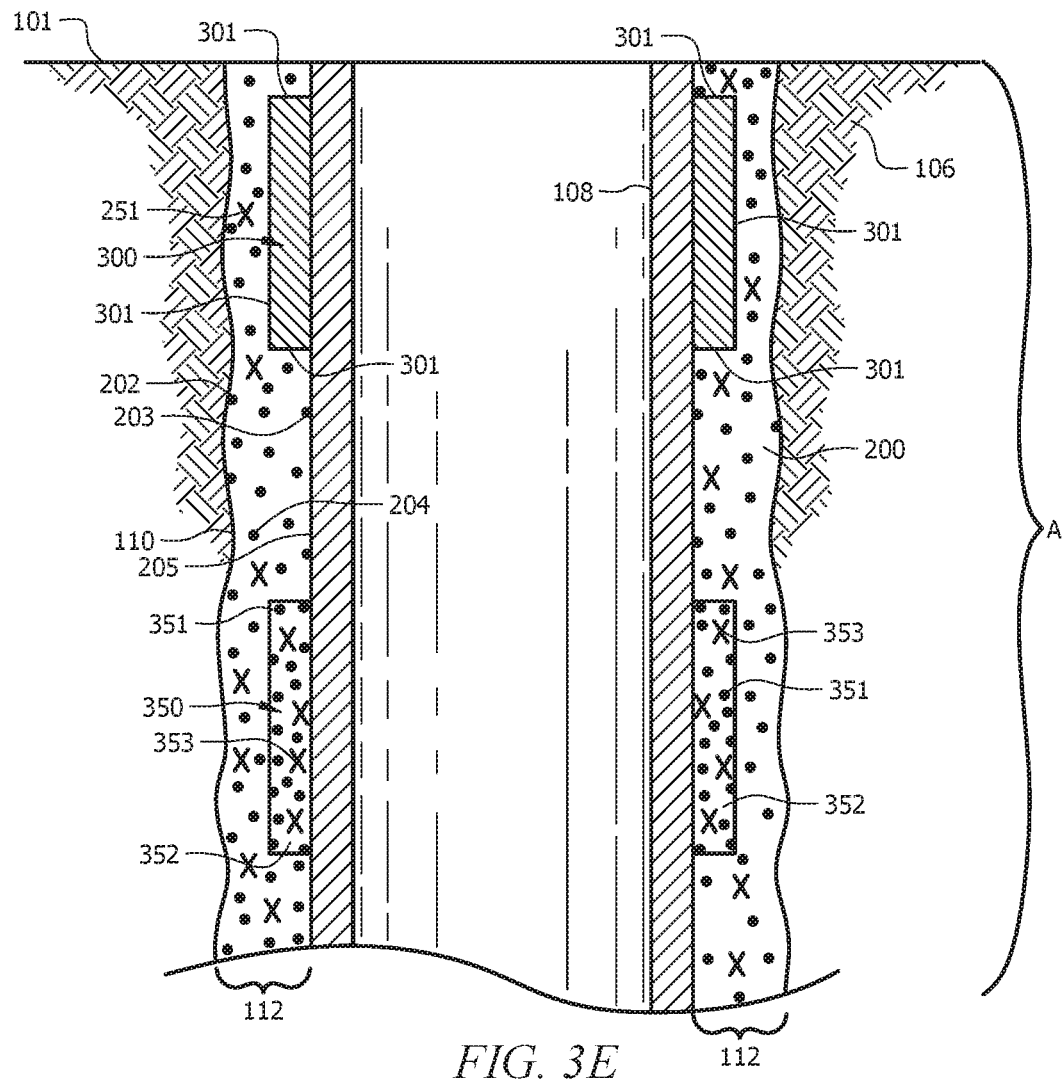
Figure 3F:
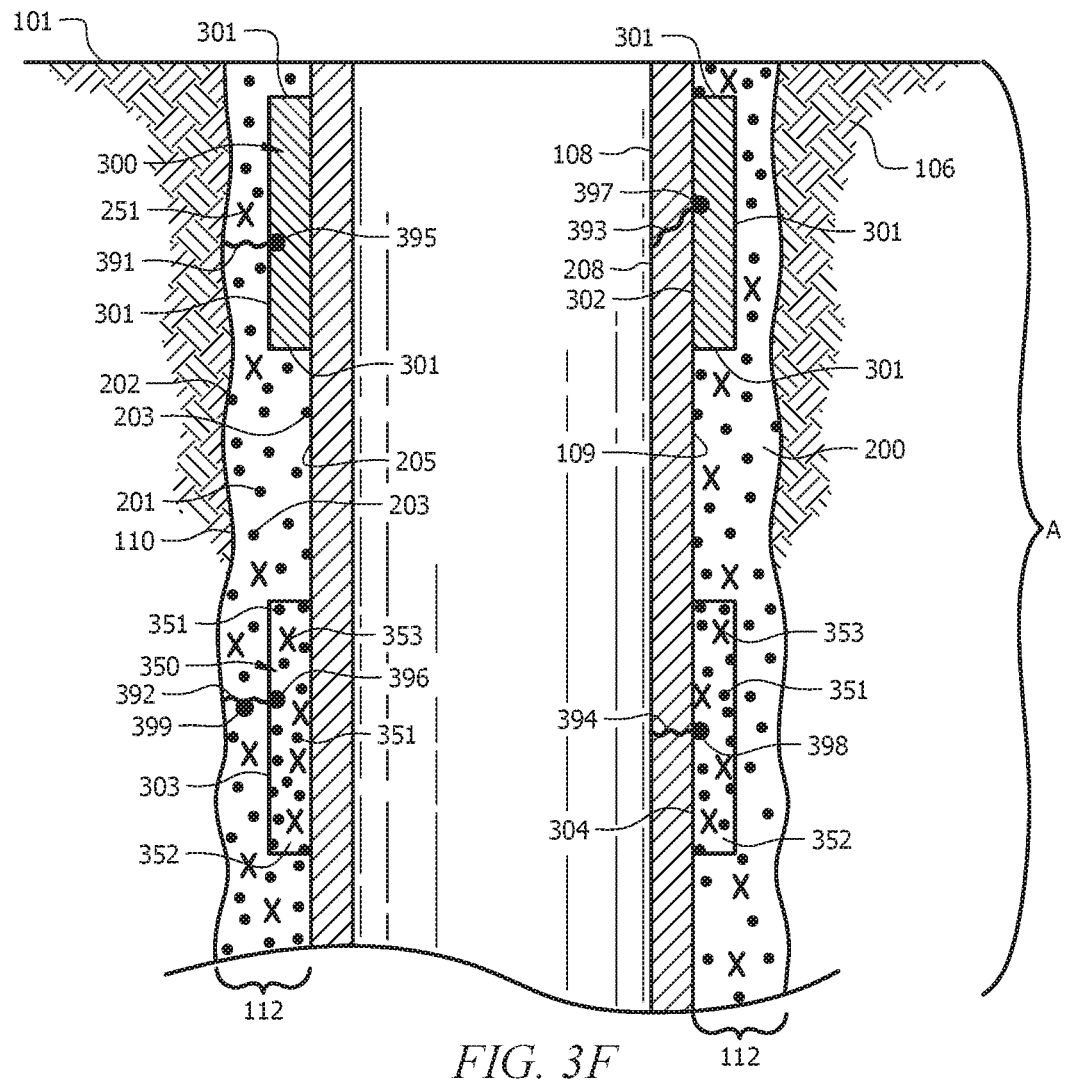

FIGS. 3A to 3F illustrate cross-sectional views of section A of the wellbore 110 of FIG. 1, having embodiments of layers 300 and 350 on an outer surface 109 of the oilfield tubular 108. Layer 300 is made of solid reactive metal(s), and layer 350 contains reactive metal(s) and other component(s). In FIGS. 3A and 3B, section A of the wellbore 110 is in an open-hole configuration, in that, there is no cement placed in the annulus 112. In FIGS. 3C and 3D, a cement composition 250 that has no reactive metal is placed in the annulus 112. In FIGS. 3E and 3F, a cement composition 200 according to the present disclosure is placed in the annulus 112. Like numbers in FIGS. 3A to 3F represent like components with respect to FIG. 1, with respect to FIGS. 2A to 2B, and with respect to one another.

While FIGS. 3A to 3F each show one layer 300 and one layer 350, it is contemplated that an oilfield tubular 108 can have one or more layers embodied only as layer 300; alternatively, it is contemplated that an oilfield tubular 108 can have one or more layers embodied only embodiments of layer 350; alternatively, it is contemplated that any combination of any number of layers 300 and any number of layers 350 can be included on portions of the outer surface 109 of the oilfield tubular 108.

In FIGS. 3A to 3F, the layer 300 of reactive metal(s) extends around the circumference of a portion of the outer surface 109 of the oilfield tubular 108 and the layer 350 of a composition that includes reactive metal(s) extends around the circumference of another portion of the outer surface 109 of the oilfield tubular 108.

The embodiment shown as layer 300 can be comprised of solid metal. The composition of the metal can be a pure species of the reactive metals disclosed herein, e.g., comprised of a reactive metal or comprised of an alloy of reactive metal. Alternative embodiments contemplate that the layer can be comprised of a combination of pure species of reactive metal(s) and/or reactive metal alloy(s).

The layer 300 can be formed by extruding an amount of the reactive metal(s) into a ring-shaped sleeve. The sleeve can have dimensions such that an inner diameter of the sleeve is equal to or greater than an outer diameter of the oilfield tubular 108 and such than an outer diameter of the sleeve is less than a diameter of the inner wall 111 of the wellbore 110. The sleeve may be placed on the oilfield tubular 108 by sliding the sleeve of reactive metal(s) along the outer surface 109 of the oilfield tubular 108 at a desired position on the oilfield tubular 108. In alternative embodiments, the layer 300 can be formed by extruding or stamping a mold of the reactive metal(s) into a brick of solid reactive metal(s) having cuboid or any shape (e.g., disc) suitable for placement into the wellbore 110 while being attached to the outer surface 109 of the oilfield tubular 108. The layer 300 can be secured to the outer surface 109 of the oilfield tubular 108 by any technique, such as melting, welding, clamping, or adhesive.

An exposed surface 301 of the layer 300 may contact water from a wellbore fluid that enters the annulus 112 so that the reactive metal atoms on the surface 301 react in the wellbore 110. Reaction of atoms of the reactive metal on the surface 301 then exposes additional atoms of reactive metal to the wellbore fluid, and exposed atoms of the reactive metal subsequently react until no water is present or until the mass of metal hydroxide particles provides enough of a seal in the annulus 112 that water from the wellbore fluid cannot permeate through the mass to reach the unreacted reactive metal.

The layer 350 is a composition that contains particles 351 of the reactive metal and other components. For example, the layer 350 contains particles 351 of the reactive metal that are dispersed into a binder material 352. The binder material may be degradable or non-degradable. In some examples, the binder material may be hydrolytically degradable. The binder material may be swellable or non-swellable. In swellable embodiments, the binder material may be oil-swellable, water-swellable, or oil- and water-swellable. In some embodiments, the binder material may be porous. In some alternative embodiments, the binder material may not be porous. General examples of the binder material include, but are not limited to, rubbers, plastics, and elastomers. Specific examples of the binder material may include, but are not limited to, polyvinyl alcohol, polylactic acid, polyurethane, polyglycolic acid, nitrile rubber, isoprene rubber, PTFE, silicone, fluoroelastomers, ethylene-based rubber, and PEEK. In some embodiments, the dispersed reactive metal may be cuttings, chunks, or particles or reactive metal(s) obtained from a machining process(es).

In some embodiments, the layer 350 may additionally include particles 353 of a galvanic dopant. As explained in more detail herein, the galvanic dopant is present to facilitate reaction (e.g., hydration) of the reactive metal(s) particles 351 with water in the wellbore fluid.

The layer 350 can be formed by hot melt extrusion of the binder material 352 in a mold. For example, the particles of reactive metal can be placed in the mold and then the binder material can be extruded in liquid form into the mold for solidification, whereby the reactive metal particles are contained in the binder material 352 after cooling to a solid state.

FIG. 3B shows that reactive metal atoms of the layer 300 have reacted with water in a wellbore fluid. The mass 360 of reaction product (i.e., metal hydroxide particles) occupies a larger volume in the annulus 112 than did the atoms from the solid metal layer 300 that reacted. The mass 360 filled the annulus 112 so as to seal the annulus 112 such that wellbore fluid from below the mass 360 and remaining solid metal of layer 300 cannot pass to a location above the mass, and vice versa.

FIG. 3B also shows that reactive metal particles 351 of the layer 350 have reacted with a wellbore fluid, and the binder material 352 has swollen. Wellbore fluid permeated into the binder material 352 to create swollen binder material 355 as well as particles 354 of metal hydroxides. The increased volume of the metal hydroxide particles 354 in combination with the swelling of the binder material 352 (i.e., collectively, a swollen mass 370) filled the annulus 112 so as to seal the annulus 112 such that wellbore fluid from below the mass 370 cannot pass to a location above the mass, and vice versa.

FIG. 3D shows cracks 381 and 382 have formed in the cement composition 250, and cracks 383 and 384 have formed in the oilfield tubular 108.

The crack 381 that formed in the cement composition 250 allowed wellbore fluid to leak into the cement composition 250 from the subterranean formation 106. Reactive metal atoms on the surface 301 of the layer 300 reacted with water to produce metal hydroxide particles 385 at a location along the surface 301 of the layer 300 where the crack 381 meets the layer 300. The metal hydroxide particles 385 filled the crack 381 in the cement composition 250 and provided a seal, and as such, the metal hydroxide particles 385 can prevent the wellbore fluid from further leaking into the cement composition 250 via the crack 381.

The crack 382 that formed in the cement composition 250 allowed wellbore fluid to leak into the cement composition 250 from the subterranean formation 106. Reactive metal particles contained within the binder material 352 reacted with water to produce metal hydroxide particles 386 in the portion of the layer 350 where the crack 382 meets the layer 350. The binder material 352 also swelled. The metal hydroxide particles 386 and the swollen binder material 352 applied pressure to the crack 382 in the cement composition 250 and provided a seal at surface 303. The metal hydroxide particles 386 can prevent the wellbore fluid from further leaking into the cement composition 250 via the crack 382.

The crack 383 that formed in the oilfield tubular 108 allowed a wellbore fluid to leak from the inner surface 208 of the oilfield tubular 108 to outer surface 109 of the oilfield tubular 108. Reactive metal atoms on the surface 302 of the layer 300 (the surface opposite of surface 301, i.e., the surface that faces the outer surface 109 of the oilfield tubular 108) reacted with water to produce metal hydroxide particles 387 at a location along the surface 302 of the layer 300 where the crack 383 meets the layer 300. The metal hydroxide particles 387 filled the crack 383 in the oilfield tubular 108 and provided a seal, and as such, the metal hydroxide particles 387 can prevent the wellbore fluid from further leaking into the oilfield tubular 108 via the crack 383.

The crack 384 that formed in the oilfield tubular 108 allowed a wellbore fluid to leak from the inner surface 208 of the oilfield tubular 108 to outer surface 109 of the oilfield tubular 108. Reactive metal particles contained within the binder material 352 reacted with water to produce a barrier 388 of metal hydroxide particles in the portion of the layer 350 where the crack 384 meets the layer 350. The binder material 352 also swelled. The barrier 388 of metal hydroxide particles and the swollen binder material 352 applied pressure to the crack 384 in the cement composition 250 and provided a seal at surface 304 (the surface that faces the outer surface 109 of the oilfield tubular 108). The barrier 388 of metal hydroxide particles can prevent the wellbore fluid from further leaking into the oilfield tubular 108 via the crack 384. The barrier 388 of metal hydroxide particles demonstrates a scenario where the reactive metals particles in layer 350 are not located at the exact point where the crack 384 contacts the layer 350. In such case, the wellbore fluid can permeate into the binder material 352 and react with reactive metal particles contained therein. The reactive metal particles contained within the binder material 352 can collectively react to form metal hydroxide particles until the barrier 388 of metal hydroxide particles is formed in the layer 350, effectively producing a seal against further penetration of the wellbore fluid.

FIG. 3F shows cracks 391 and 392 have formed in the cement composition 200, and cracks 393 and 394 have formed in the oilfield tubular 108. FIG. 3F demonstrates the use of reactive metals in both the cement composition 200 and in layers 300 and 350.

The crack 391 that formed in the cement composition 200 allowed wellbore fluid to leak into the cement composition 200 from the subterranean formation 106. Reactive metal atoms on the surface 301 of the layer 300 reacted with water to produce metal hydroxide particles 395 at a location along the surface 301 of the layer 300 where the crack 391 meets the layer 300. The metal hydroxide particles 395 filled the crack 391 in the cement composition 200 and provided a seal, and as such, the metal hydroxide particles 395 can prevent the wellbore fluid from further leaking into the cement composition 200 via the crack 391.

The crack 392 that formed in the cement composition 200 allowed wellbore fluid to leak into the cement composition 200 from the subterranean formation 106. Reactive metal particles contained within the binder material 352 reacted with water to produce metal hydroxide particles 396 in the portion of the layer 350 where the crack 392 meets the layer 350. The binder material 352 also swelled. The metal hydroxide particle 396 and the swollen binder material 352 applied pressure to the crack 392 in the cement composition 200 and provided a seal at surface 303. The metal hydroxide particle 396 can prevent the wellbore fluid from further leaking into the cement composition 200 via the crack 392. It is further demonstrated that a reactive metal particle contained within the cement composition 200 has reacted with water in the leaked wellbore fluid to produce metal hydroxide particle 399. The metal hydroxide particle 399 can additionally prevent the wellbore fluid from further leaking into the cement composition 200 via the crack 392.

The crack 393 that formed in the oilfield tubular 108 allowed a wellbore fluid to leak from the inner surface 208 of the oilfield tubular 108 to outer surface 109 of the oilfield tubular 108. Reactive metal atoms on the surface 302 of the layer 300 (the surface opposite of surface 301, i.e., the surface that faces the outer surface 109 of the oilfield tubular 108) reacted with water to produce metal hydroxide particles 397 at a location along the surface 302 of the layer 300 where the crack 393 meets the layer 300. The metal hydroxide particles 397 filled the crack 393 in the oilfield tubular 108 and provided a seal, and as such, the metal hydroxide particles 397 can prevent the wellbore fluid from further leaking into the oilfield tubular 108 via the crack 393.

The crack 394 that formed in the oilfield tubular 108 allowed a wellbore fluid to leak from the inner surface 208 of the oilfield tubular 108 to outer surface 109 of the oilfield tubular 108. A reactive metal particle contained within the binder material 352 reacted with water to produce a metal hydroxide particle 398 in the portion of the layer 350 where the crack 394 meets the layer 350. The binder material 352 also swelled. The metal hydroxide particle 398 and the swollen binder material 352 applied pressure to the crack 394 in the cement composition 250 and provided a seal at surface 304 (the surface that faces the outer surface 109 of the oilfield tubular 108). The metal hydroxide particle 398 can prevent the wellbore fluid from further leaking into the oilfield tubular 108 via the crack 394.

In FIGS. 3A to 3F, the thickness of layers 300 and 350 can be any thickness that would fit in the annulus 112 prior to introducing cementing compositions into the annulus 112. It is contemplated that layers 300 and 350 embodied as sleeves or wraps can have a thickness greater than a coating, since coating embodiments are discussed in FIGS. 4A to 4D. In embodiments, a thickness of layer 300 or 350 can be in a range of from 0.039 inches (0.1 cm) to 1.97 inches (5 cm).

Figure 4A:
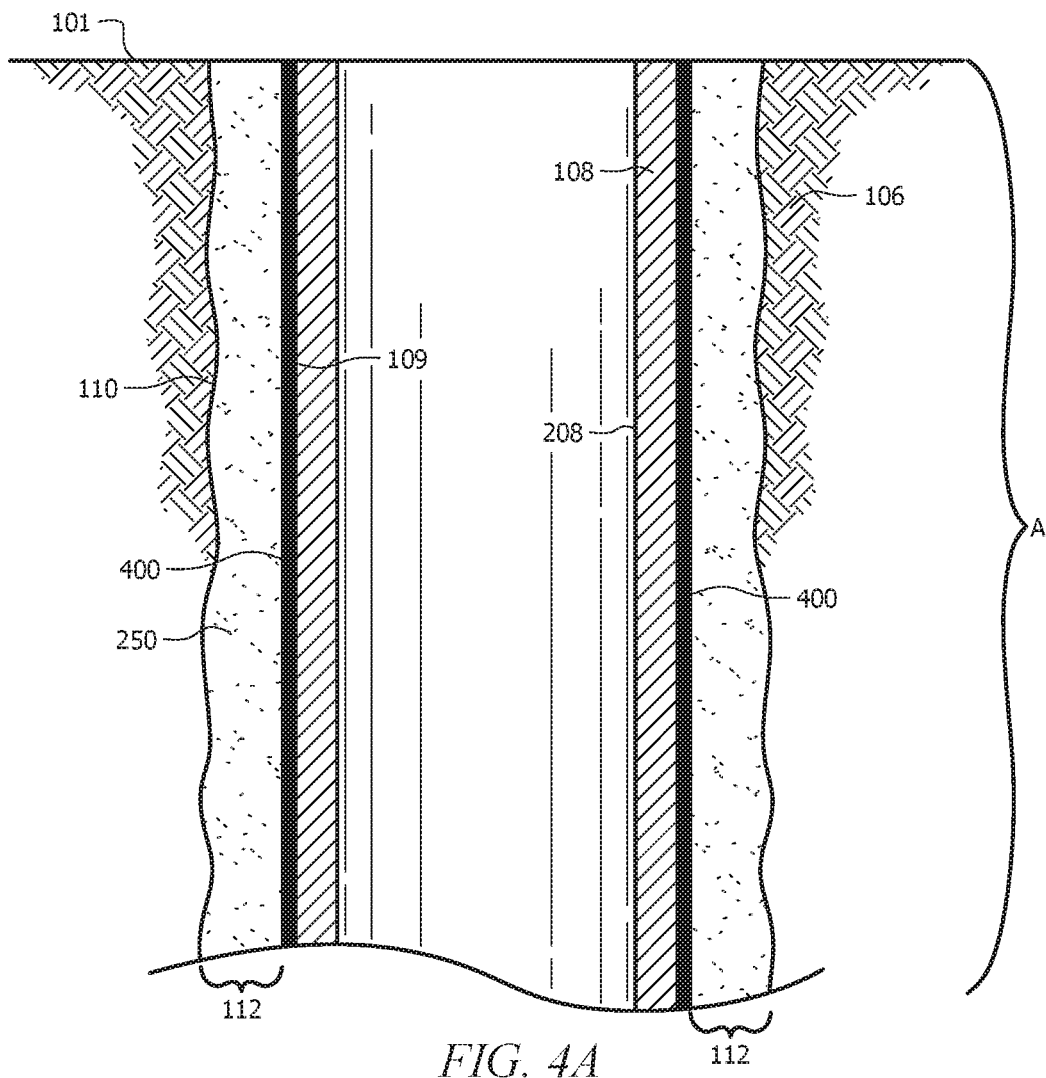
FIGS. 4A to 4D illustrate cross-sectional views of section A of the wellbore of FIG. 1, having a layer of reactive metal embodied as a coating on an outer surface of the oilfield tubular.
Figure 4B:
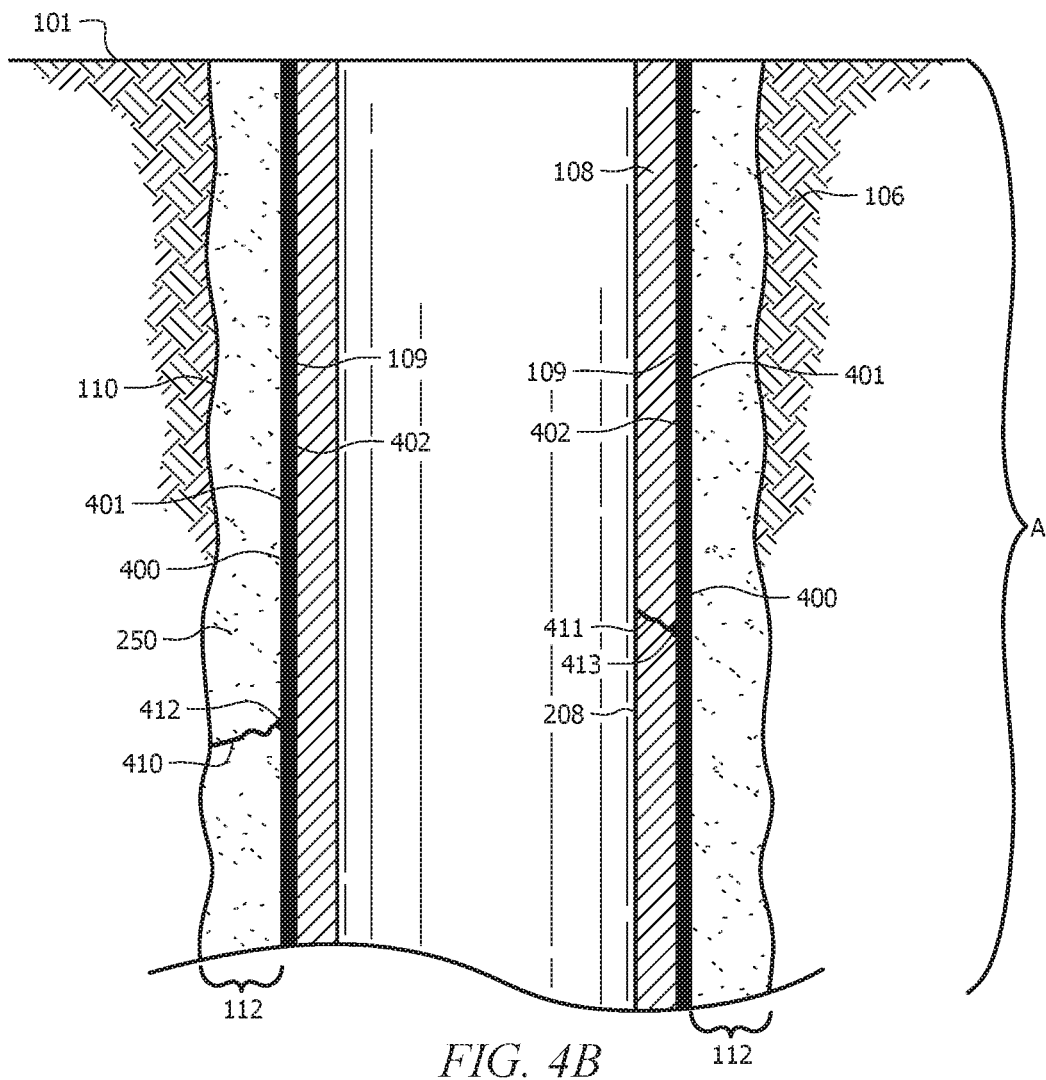
Figure 4C:
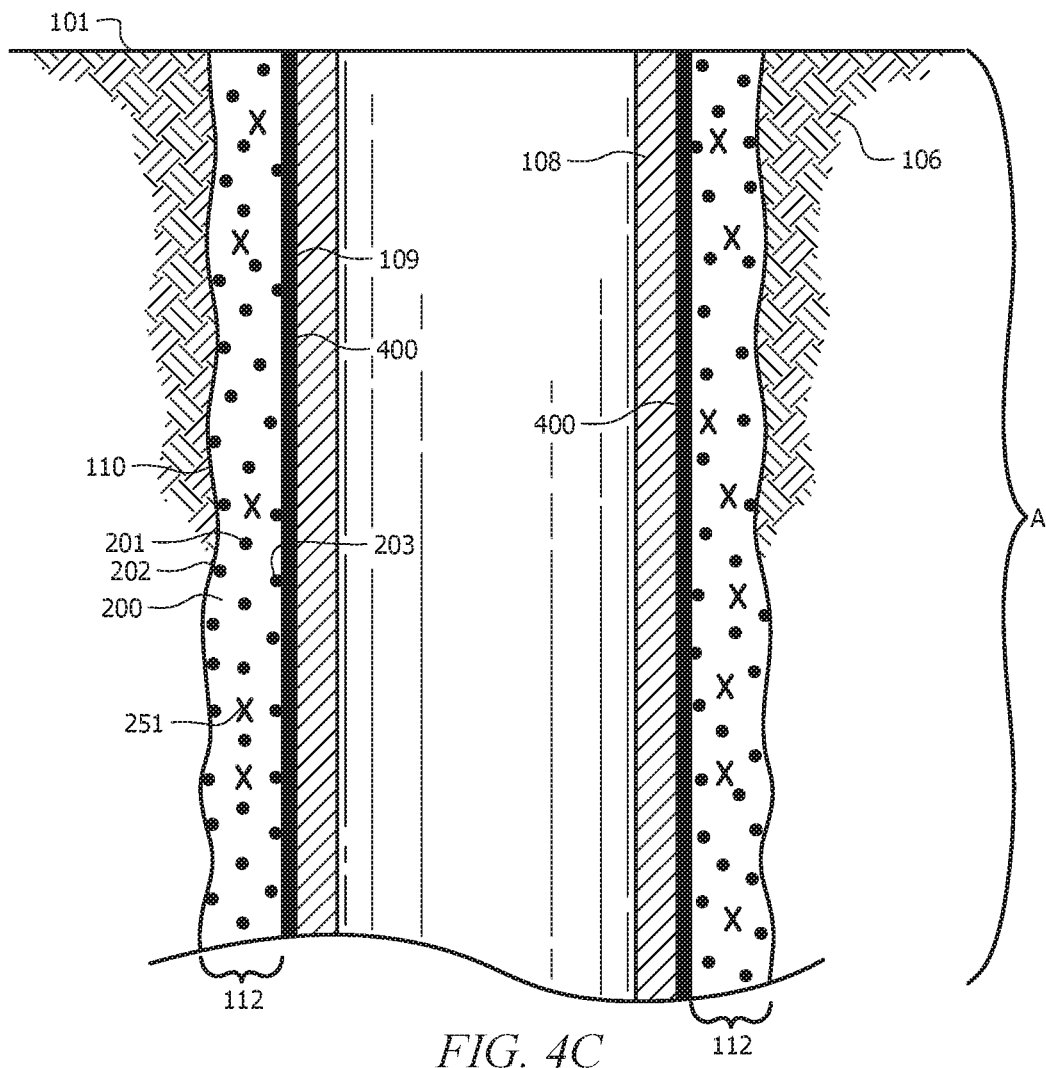
Figure 4D:
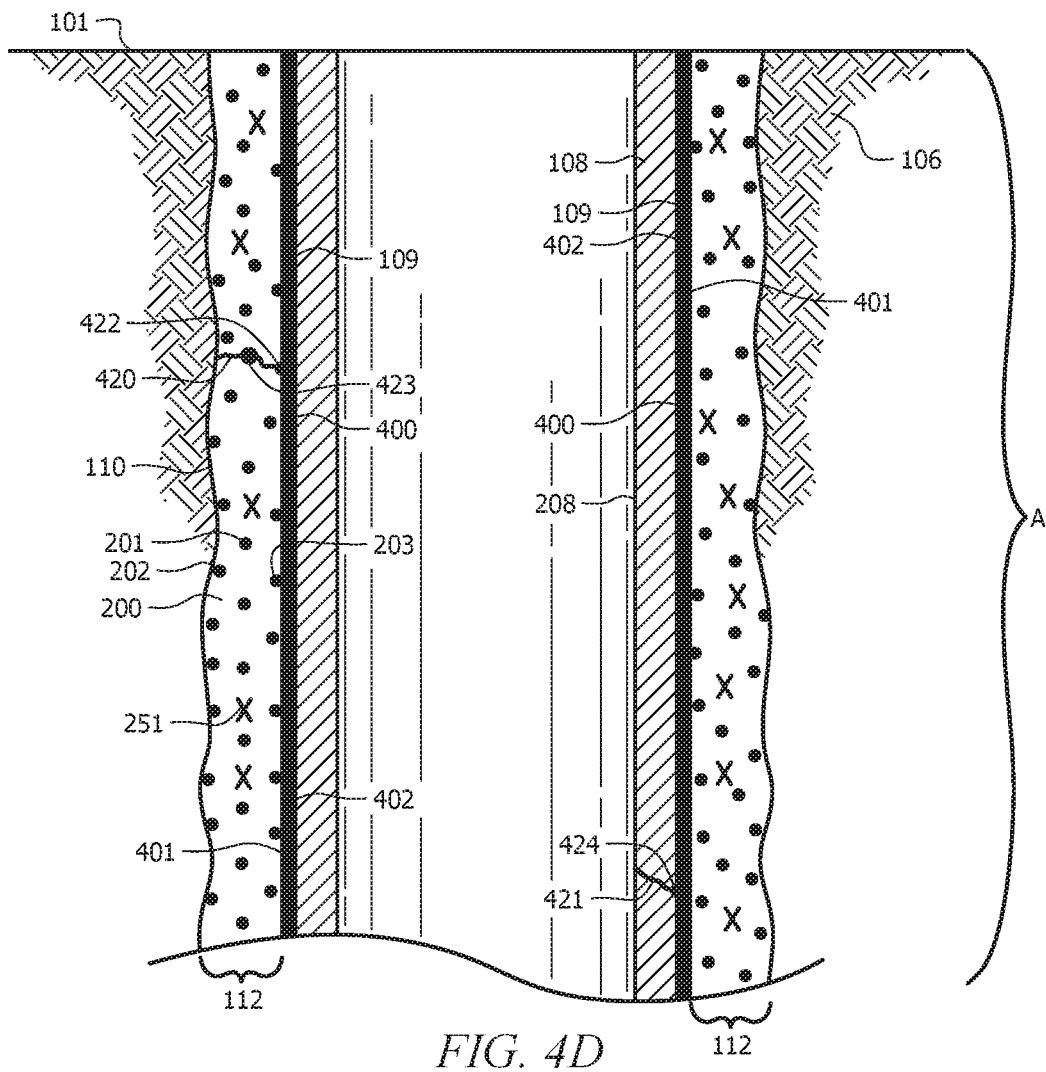

FIGS. 4A to 4D illustrate cross-sectional views of section A of the wellbore 110 of FIG. 1, having a layer of reactive metal embodied as a coating on an outer surface 109 of the oilfield tubular 108. In FIGS. 4A and 4B, a cement composition 250 that has no reactive metal is placed in the annulus 112. In FIGS. 4C and 4D, a cement composition 200 according to the present disclosure is placed in the annulus 112. Like numbers in FIGS. 4A to 4D represent like components with respect to FIG. 1, with respect to FIGS. 2A to 2B, with respect to FIGS. 3A to 3F, and with respect to one another.

In FIGS. 4A and 4B, the subterranean formation 106, wellbore 110, oilfield tubular 108, and cement composition 250 are the same as described for FIGS. 3C and 3D. In FIGS. 4C and 4D, the subterranean formation 106, wellbore 110, oilfield tubular 108, and cement composition 200 are the same as described for FIGS. 3E and 3F.

The reactive metal(s) in each of FIGS. 4A to 4D are contained in a layer 400 embodied as a coating on an outer surface 109 of the oilfield tubular 108. The coating can be applied to the outer surface 109 (or at least a portion thereof) via a technique known that is suitable for depositing particles of the reactive metal(s) onto the outer surface 109 such as binder casting, chemical deposition, physical deposition, electroplating, and sputtering. The coating may be applied electrostatically with a binder and then the binder-metal combination may be cured under heat. While the entire outer surface 109 in FIGS. 4A to 4D has a coating, it is contemplated that the coating may be only on a portion of the outer surface 109. Alternatively, the coating can be divided into any number of separate areas at any location along any portion(s) of the outer surface 109.

In embodiments, the coating can have a thickness in a range of about 0.00039 inches (0.01 mm) to about 0.039 inches (1 mm).

In embodiments, the layer 400 embodied as a coating can be applied to the outer surface 109 of the oilfield tubular 108 by plating, deposition, or dipping. In a dipping technique, it is contemplated that the tubular 108 is dipped into a liquid mixture containing reactive metal particles such that the mixture dries and affixes the reactive metal particles on the outer surface 109 of the oilfield tubular 108.

In alternative embodiments, the layer 400 embodied as a coating is a tape have a side that adheres to the outer surface 109 of the tubular 108 and an opposite side that adheres to reactive metal particles, suitable for movement downhole in a wellbore 110.

FIG. 4B shows crack 410 has formed in the cement composition 250, and crack 411 has formed in the oilfield tubular 108.

The crack 410 that formed in the cement composition 250 allowed wellbore fluid to leak into the cement composition 250 from the subterranean formation 106. Reactive metal particles on the surface 401 of the layer 300 reacted with water to produce metal hydroxide particles 412 at a location along the surface 401 of the coating where the crack 410 meets the coating. The metal hydroxide particles 412 filled the crack 410 in the cement composition 250 and provided a seal, and as such, the metal hydroxide particles 412 can prevent the wellbore fluid from further leaking into the cement composition 250 via the crack 410.

The crack 411 that formed in the oilfield tubular 108 allowed a wellbore fluid to leak from the inner surface 208 of the oilfield tubular 108 to outer surface 109 of the oilfield tubular 108. Reactive metal particles on the surface 402 of the coating (the surface opposite of surface 401, i.e., the surface that faces the outer surface 109 of the oilfield tubular 108) reacted with water to produce metal hydroxide particles 413 at a location along the surface 402 of the coating where the crack 411 meets the coating. The metal hydroxide particles 413 filled the crack 411 in the oilfield tubular 108 and provided a seal, and as such, the metal hydroxide particles 413 can prevent the wellbore fluid from further leaking into the oilfield tubular 108 via the crack 411.

FIG. 4D shows crack 420 has formed in the cement composition 200, and crack 421 has formed in the oilfield tubular 108. FIG. 4D demonstrates the use of reactive metals in both the cement composition 200 and in coating.

The crack 420 that formed in the cement composition 200 allowed wellbore fluid to leak into the cement composition 200 from the subterranean formation 106. Reactive metal particles on the surface 401 of the coating reacted with water to produce metal hydroxide particles 422 at a location along the surface 401 of the coating where the crack 420 meets the coating. The metal hydroxide particles 422 filled the crack 420 in the cement composition 200 and provided a seal, and as such, the metal hydroxide particles 422 can prevent the wellbore fluid from further leaking into the cement composition 200 via the crack 420. It is further demonstrated that a reactive metal particle contained within the cement composition 200 has reacted with water in the leaked wellbore fluid to produce metal hydroxide particle 423. The metal hydroxide particle 423 can additionally prevent the wellbore fluid from further leaking into the cement composition 200 via the crack 420.

The crack 421 that formed in the oilfield tubular 108 allowed a wellbore fluid to leak from the inner surface 208 of the oilfield tubular 108 to outer surface 109 of the oilfield tubular 108. Reactive metal particles on the surface 402 of the coating (the surface opposite of surface 401, i.e., the surface that faces the outer surface 109 of the oilfield tubular 108) reacted with water to produce metal hydroxide particles 424 at a location along the surface 402 of the coating where the crack 421 meets the coating. The metal hydroxide particles 424 filled the crack 421 in the oilfield tubular 108 and provided a seal, and as such, the metal hydroxide particles 424 can prevent the wellbore fluid from further leaking into the oilfield tubular 108 via the crack 421.

The reactive metal(s) for use in any of the disclosed embodiments can be any metal or metal alloy that may undergo a hydration reaction to form a metal hydroxide of greater volume than the base metal or metal alloy reactant. Examples of a reactive metal include magnesium, an alloy of magnesium, calcium, an alloy of calcium, aluminum, an alloy of aluminum, tin, an alloy of tin, zinc, an alloy of zinc, or any combination thereof. Preferred reactive metals include magnesium, an alloy of magnesium, calcium, an alloy of calcium, aluminum, an alloy of aluminum, or any combination thereof. Specific reactive metal alloys include magnesium-zinc, magnesium-aluminum, calcium-magnesium, and aluminum-copper. In one application, the reactive metal is a magnesium alloy including magnesium alloys that are alloyed with Al, Zn, Mn, Zr, Y, Nd, Gd, Ag, Ca, Sn, RE, or combinations thereof. In some applications, the alloy is further alloyed with a dopant that promotes galvanic reaction, such as Ni, Fe, Cu, Co, Ir, Au, Pd, or combinations thereof.

In some embodiments, an electrical conductivity of the reactive metal is greater than 5,000, greater than 6,000, greater than 7,000, greater than 8,000, greater than 9,000, or greater than 10,000 Siemens/meter. In some additional embodiments, the electrical conductivity of the reactive metal is less than 50,000,000 Siemens/meter.

In embodiments where the reactive metal(s) is or includes a metal alloy, the metal alloy may be produced from a solid solution process or a powder metallurgical process. The metal alloy may be formed either from the metal alloy production process or through subsequent processing of the metal alloy.

As used herein, the term "solid solution" refers to an alloy that is formed from a single melt where all of the components in the alloy (e.g., a magnesium alloy) are melted together in a casting. The casting can be subsequently extruded, wrought, hipped, or worked to form the desired shape for the reactive metal(s). Preferably, the alloying components are uniformly distributed throughout the metal alloy, although intra-granular inclusions may be present, without departing from the scope of the present disclosure. It is to be understood that some minor variations in the distribution of the alloying particles can occur, but it is preferred that the distribution is such that a homogeneous solid solution of the metal alloy is produced. A solid solution is a solid-state solution of one or more solutes in a solvent. Such a mixture is considered a solution rather than a compound when the crystal structure of the solvent remains unchanged by addition of the solutes, and when the mixture remains in a single homogeneous phase.

A powder metallurgy process generally obtains or produces a fusible alloy matrix in a powdered form. The powdered fusible alloy matrix is then placed in a mold or blended with at least one other type of particle and then placed into a mold. Pressure is applied to the mold to compact the powder particles together, fusing them to form a solid material which may be used as the reactive metal particles or solid layer of reactive metal.

In embodiments, the reactive metal(s), once the chemical reaction is completed, does not degrade (e.g., is water-insoluble) in a wellbore fluid that is or includes a brine. For example, magnesium hydroxide and calcium hydroxide have low solubility in water.

As discussed above, the reactive metal(s) disclosed herein react by undergoing metal hydration reactions in the presence of water contained in a wellbore fluid (e.g., brines) to form metal hydroxides. A metal hydroxide particle occupies more space than the base reactive metal particle. This change in volume allows the reactive metal hydroxide particles to fill cracks, gaps, and micro-annuli that can form i) in a disclosed cement composition placed in an annulus 112 between the inner wall 111 of the wellbore 110 and an outer surface 109 of the oilfield tubular 108, ii) in the subterranean formation 106 and extend to the inner wall 111 of the wellbore 110, or iii) in the oilfield tubular 108. For example, a mole of magnesium has a molar mass of 24 g/mol and a density of 1.74 g/cm$^3$ which results in a volume of 13.8 cm$^3$/mol. Magnesium hydroxide has a molar mass of 60 g/mol and a density of 2.34 g/cm$^3$ which results in a volume of 25.6 cm$^3$/mol. 25.6 cm$^3$/mol is 85% more volume than 13.8 cm$^3$/mol. As another example, a mole of calcium has a molar mass of 40 g/mol and a density of 1.54 g/cm$^3$ which results in a volume of 26.0 cm$^3$/mol. Calcium hydroxide has a molar mass of 76 g/mol and a density of 2.21 g/cm$^3$ which results in a volume of 34.4 cm$^3$/mol. 34.4 cm$^3$/mol is 32% more volume than 26.0 cm$^3$/mol. As yet another example, a mole of aluminum has a molar mass of 27 g/mol and a density of 2.7 g/cm$^3$ which results in a volume of 10.0 cm$^3$/mol. Aluminum hydroxide has a molar mass of 63 g/mol and a density of 2.42 g/cm$^3$ which results in a volume of 26 cm$^3$/mol. 26 cm$^3$/mol is 160% more volume than 10 cm$^3$/mol.

In embodiments, the volume of the annulus 112 in which the reactive metal(s) is disposed is less than the volume of the metal hydroxide particles that could potentially be formed by reaction of the reactive metal atoms or particles with a wellbore fluid. In some examples, the volume of the annulus 112 is less than as much as 50% of the metal hydroxide particle volume. Additionally or alternatively, the volume of the annulus 112 in which the reactive metal atoms/particles are be disposed may be less than 90%, less than 80%, less than 70%, or less than 60% of the metal hydroxide particle volume.

In some embodiments, the metal hydroxide formed from the reactive metal(s) may be dehydrated under sufficient pressure. For example, if the metal hydroxide resists movement from additional hydroxide formation, elevated pressure may be created which may dehydrate some of the metal hydroxide particles to form a reactive metal oxide or the reactive metal. As an example, magnesium hydroxide may be dehydrated under sufficient pressure to form magnesium oxide and water. As another example, calcium hydroxide may be dehydrated under sufficient pressure to form calcium oxide and water. As yet another example, aluminum hydroxide may be dehydrated under sufficient pressure to form aluminum oxide and water. In some embodiments, the dehydration of the metal hydroxide to the reactive metal may allow the reactive metal to again react to form a metal hydroxide (i.e., the dehydration is reversible once pressure is relieved and in the presence of water).

As explained above, the galvanic dopant can be included with the reactive metal(s) to facilitate reaction (e.g., hydration) of the reactive metal(s) with water in the wellbore fluid. In embodiments, the galvanic dopant can be Zn, Cu, Ni, Al, or any combination thereof.

The wellbore fluid described herein generally includes water. In some embodiments, the wellbore fluid is a brine. The brine may include saltwater (e.g., water containing one or more salts dissolved therein), saturated saltwater (e.g., saltwater produced from a subterranean formation), seawater, fresh water, or any combination thereof. Generally, the brine may be from any source. The brine may be a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some examples, the salinity of the brine may exceed 10%. In said examples, use of elastomeric binder materials may be impacted. Advantageously, the byproduct of the reactive metal(s) of the present disclosure is not impacted by contact with high-salinity brines.

The cement compositions of the present disclosure can include any component useful for cementing oilfield tubulars in a wellbore, in addition to the reactive metal(s) of the disclosure. Generally, cement compositions include cement, water and optionally one or more additives. Cement compositions of the present disclosure additionally include solid particles of a reactive metal that is reactive with a wellbore fluid to form a metal hydroxide in-situ of a wellbore. The type of water, type of cement, and type of additive is not limited by the disclosure, and any fluid containing any purity of water, any cement, and any additive that is useful for cementing an oilfield tubular within a wellbore can be used as part of a cement composition in combination with the reactive metal(s) disclosed herein. In some embodiments, the water can be fresh water, salt water, brine, or other type of water. In some embodiments, and by example only, the cement can be a Portland cement, a hydraulic cement, or a blend of any types of cement. In some embodiments, and by example only, additives can include foaming agents, defoaming agents, fluid loss agents, lost circulation agents, expansion agents, hardening accelerators, hardening retarders, density reducing agents (e.g., perlite, fly ash, silica fume, or microspheres), or combinations thereof.

The disclosed methods include a method for cementing an oilfield tubular 108 into a wellbore 110 formed in a subterranean formation 106. The method for cementing can include introducing a cement composition 200 or 250 into an annulus formed between an inner surface 111 of the wellbore 110 and an outer surface 109 of the oilfield tubular 108. In some embodiments, the cement composition 250 can be a traditional composition without reactive metals. In other embodiments, the cement composition 200 includes a reactive metal (e.g., embodied as particles) that is reactive with a wellbore fluid to form a metal hydroxide in-situ of the wellbore 110. Introducing the cement composition 200 or 250 can include any technique disclosed herein, such as pumping the cement composition 200 or 250 as a slurry into the wellbore 110 and then upward into the annulus 112, or pumping the cement composition 200 or 250 in reverse circulation cementing. In the methods, as is described above, the reactive metal is present in the cement composition 200 as solid particles. In embodiments, the reactive metal is selected from any of those disclosed above, including from magnesium, a magnesium alloy, calcium, a calcium alloy, aluminum, an aluminum alloy, or a combination thereof. In some embodiments of the method, a portion of the outer surface 109 of the oilfield tubular 108 can include a layer 300 of the reactive metal or a layer 350 of a composition that includes the reactive metal. In some embodiments, as described herein the layer 300 or 350 can be a solid ring-shaped sleeve of the reactive metal. In some embodiments, the layer is embodied as a coating of or containing the reactive metal.

The disclosed methods also include providing a layer 300, 350, or 400 of a composition that includes a reactive metal to at least a portion of an outer surface of an oilfield tubular 108, wherein the reactive metal is reactive with a wellbore fluid to form a metal hydroxide in-situ of the wellbore 110. In embodiments, the reactive metal is selected from any of those disclose above, such as magnesium, a magnesium alloy, calcium, a calcium alloy, aluminum, an aluminum alloy, or a combination thereof. In some embodiments the layer 400 is a coating of the composition, wherein providing the layer 400 includes depositing solid particles of the reactive metal onto the outer surface 109 of the oilfield tubular 108. In alternative embodiments, the layer 300 or 350 is a solid ring-shaped sleeve of the composition, and providing the layer 300 or 350 includes placing the sleeve onto the outer surface 109 of the oilfield tubular 108. In some embodiments, the composition consists of the reactive metal. In alternative embodiments, the composition can include a galvanic dopant. The method of providing a layer of a composition can additionally include introducing the oilfield tubular 108 into the wellbore 110, and the layer 300, 350, or 400 is provided on the oilfield tubular 108 before the oilfield tubular 108 is introduced into the wellbore 110.

Additional Disclosure

The following are non-limiting, specific embodiments in accordance with the present disclosure:

Embodiment A: A method for cementing an oilfield tubular into a wellbore formed in a subterranean formation, the method comprising: introducing a cement composition into an annulus formed between an inner surface of the wellbore and an outer surface of the oilfield tubular, wherein the cement composition comprises a reactive metal that is reactive with a wellbore fluid to form a metal hydroxide in-situ of the wellbore.

Embodiment B: The method of A, wherein the reactive metal is present in the cement composition as solid particles, optionally, wherein the solid particles have a particle size of greater than 0.003 inches (0.0076 cm).

Embodiment C: The method of A or B, wherein the reactive metal is selected from a magnesium, a magnesium alloy, calcium, a calcium alloy, aluminum, an aluminum alloy, or a combination thereof.

Embodiment D: The method of any of A to C, wherein at least a portion of the outer surface of the oilfield tubular further comprises a layer of the reactive metal or a layer of a composition comprising the reactive metal, and optionally, wherein a thickness of the layer is in a range of from 0.039 inches (0.1 cm) to 1.97 inches (5 cm).

Embodiment E: The method of any of A to D, wherein the layer comprises a coating of the reactive metal or a sleeve of the reactive metal, and optionally, wherein a thickness of the coating is in a range of about 0.00039 inches (0.01 mm) to about 0.039 inches (1 mm).

Embodiment F: A method, optionally of A to E, comprising providing a layer of a composition comprising a reactive metal to at least a portion of an outer surface of an oilfield tubular, wherein the reactive metal is reactive with a wellbore fluid to form a metal hydroxide in-situ of a wellbore.

Embodiment G: The method of F, wherein the reactive metal is selected from magnesium, a magnesium alloy, calcium, a calcium alloy, aluminum, an aluminum alloy, or a combination thereof.

Embodiment H: The method of F or G, wherein the layer is a coating of the composition, wherein applying the layer comprises depositing solid particles of the reactive metal onto the outer surface of the oilfield tubular, and optionally, wherein a thickness of the coating is in a range of about 0.00039 inches (0.01 mm) to about 0.039 inches (1 mm).

Embodiment I: The method of F or G, wherein the layer is a sleeve of the composition, wherein applying the layer comprises placing the sleeve onto the outer surface of the oilfield tubular, and optionally, wherein a thickness of the layer is in a range of from 0.039 inches (0.1 cm) to 1.97 inches (5 cm).

Embodiment J: The method of any of F to I, wherein the composition consists of the reactive metal.

Embodiment K: The method of any of F to I, wherein the composition further comprises a galvanic dopant.

Embodiment L: The method of any of F to K, further comprising introducing the oilfield tubular into the wellbore, wherein the layer is applied before the oilfield tubular is introduced into the wellbore.

Embodiment M: A cement composition comprising cement, water, solid particles of a reactive metal that is reactive with a wellbore fluid to form a metal hydroxide in-situ of a wellbore, and optionally one or more additives.

Embodiment N: The cement composition of M, wherein the reactive metal is selected from magnesium, a magnesium alloy, calcium, a calcium alloy, aluminum, an aluminum alloy, or a combination thereof.

Embodiment O: The cement composition of M or N, (a) wherein the reactive metal has an electrical conductivity greater than 10,000 Siemens/meter and less than 50,000,000 Siemens/meter; (b) wherein the solid particles have a dimension greater than 0.01 inches (0.0254 cm); (c) wherein the solid particles have a particle size of greater than 0.003 inches (0.0076 cm); or (d) a combination of any of (a) to (c).

Embodiment P: An oilfield tubular having an outer surface, wherein at least a portion of the outer surface comprises a layer of a composition comprising a reactive metal, wherein the reactive metal is reactive with a wellbore fluid to form a metal hydroxide in-situ of a wellbore.

Embodiment Q: The oilfield tubular of P, wherein the reactive metal is selected from magnesium, a magnesium alloy, calcium, a calcium alloy, aluminum, an aluminum alloy, or a combination thereof.

Embodiment R: The oilfield tubular of P or Q, wherein the layer is a coating or a sleeve of the composition.

Embodiment S: The oilfield tubular of R, wherein a thickness of the coating is in a range of about 0.00039 inches (0.01 mm) to about 0.039 inches (1 mm).

Embodiment T: The oilfield tubular of R, wherein a thickness of the sleeve is in a range of from 0.039 inches (0.1 cm) to 1.97 inches (5 cm).

Embodiment U: The oilfield tubular of any of P to T, wherein the composition consists of the reactive metal.

Embodiment V: The oilfield tubular of any of P to U, wherein the composition further comprises a galvanic dopant.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method for cementing an oilfield tubular into a wellbore formed in a subterranean formation, the method comprising:
   introducing a cement composition into an annulus formed between an inner surface of the wellbore and an outer surface of the oilfield tubular,
   wherein the cement composition comprises a reactive metal that is reactive with a wellbore fluid to form a metal hydroxide in-situ of the wellbore,
   wherein the reactive metal is selected from magnesium, a magnesium alloy, calcium, a calcium alloy, aluminum, an aluminum alloy, or a combination thereof.

2. The method of claim 1, wherein the reactive metal is present in the cement composition as solid particles.

3. The method of claim 2, wherein the solid particles have a particle size of greater than 0.003 inches (0.0076 cm).

4. The method of claim 1, wherein at least a portion of the outer surface of the oilfield tubular further comprises a layer of the reactive metal or a layer of a composition comprising the reactive metal.

5. The method of claim 4, wherein the layer comprises a coating of the reactive metal or a sleeve of the reactive metal.

6. A method comprising:
   providing a layer of a composition comprising a reactive metal to at least a portion of an outer surface of an oilfield tubular, wherein the reactive metal is reactive with a wellbore fluid to form a metal hydroxide in-situ of a wellbore,
   wherein the reactive metal is selected from magnesium, a magnesium alloy, calcium, a calcium alloy, aluminum, an aluminum alloy, or a combination thereof.

7. The method of claim 6, wherein the layer is a coating of the composition, wherein applying the layer comprises depositing solid particles of the reactive metal onto the outer surface of the oilfield tubular.

8. The method of claim 7, wherein a thickness of the coating is in a range of about 0.00039 inches (0.01 mm) to about 0.039 inches (1 mm).

9. The method of claim 6, wherein the layer is a sleeve of the composition, wherein applying the layer comprises placing the sleeve onto the outer surface of the oilfield tubular.

10. The method of claim 9, wherein a thickness of the layer is in a range of from 0.039 inches (0.1 cm) to 1.97 inches (5 cm).

11. The method of claim 6, wherein the composition consists of the reactive metal.

12. The method of claim 6, wherein the composition further comprises a galvanic dopant.

13. The method of claim 6, further comprising introducing the oilfield tubular into the wellbore, wherein the layer is applied before the oilfield tubular is introduced into the wellbore.

14. A cement composition comprising cement, water, solid particles of a reactive metal that is reactive with a wellbore fluid to form a metal hydroxide in-situ of a wellbore, and optionally one or more additives, wherein the reactive metal is selected from magnesium, a magnesium alloy, calcium, a calcium alloy, aluminum, an aluminum alloy, or a combination thereof.

15. The cement composition of claim 14, wherein the reactive metal has an electrical conductivity greater than 10,000 Siemens/meter and less than 50,000,000 Siemens/meter.

16. The cement composition of claim 14, wherein the solid particles of the reactive metal have a dimension greater than 0.01 inches (0.0254 cm).

17. The cement composition of claim 14, wherein the solid particles of the reactive metal have a particle size of greater than 0.003 inches (0.0076 cm).

* * * * *